J. HARTMAN, Jr.
Cart Scales.
No. 19,466.
Patented Feb. 23, 1858.
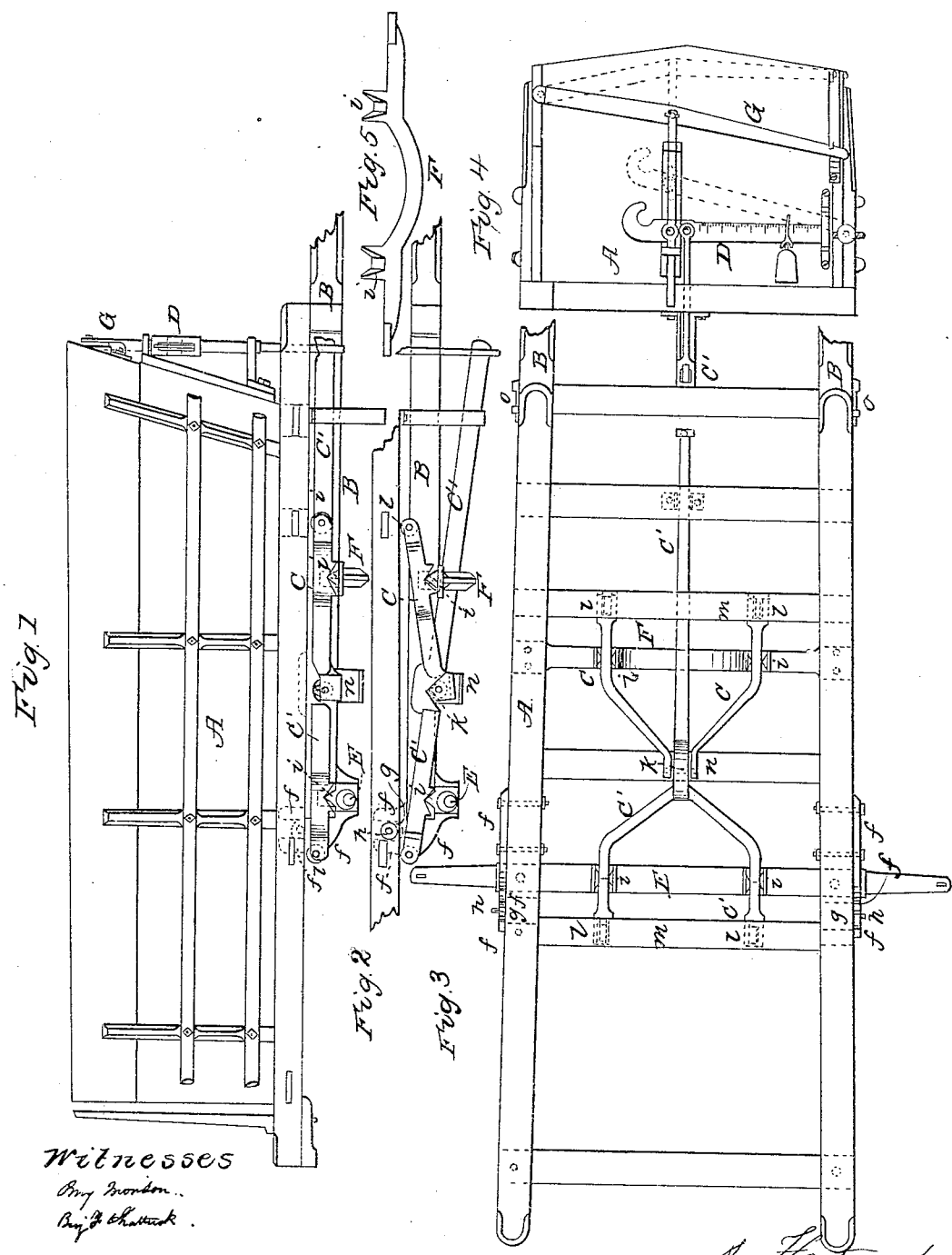

UNITED STATES PATENT OFFICE.

JOHN HARTMAN, JR., OF PHILADELPHIA, PENNSYLVANIA, ASSIGNOR TO JOHN HARTMAN, SR., OF SAME PLACE.

CONSTRUCTION AND ARRANGEMENT OF THE WEIGHING MECHANISM APPLIED TO THE CARTS OF COAL DEALERS AND OTHERS.

Specification of Letters Patent No. 19,466, dated February 23, 1858.

*To all whom it may concern.*

Be it known that I, JOHN HARTMAN, Jr., of the city of Philadelphia, in the State of Pennsylvania, have invented a new and useful improvement in the construction and arrangement of the weighing apparatus as applied to the carts used by coal dealers and others; and I do hereby declare that the following is a full, clear, and exact description of the construction and operation of the same, reference being had to the accompanying drawings, making a part of this specification, in which—

Figure 1, represents a side view of the cart body with a longitudinal sectional representation of that part of the weighing apparatus, which is beneath the same, in the position which it is made to assume when not in use to support the body of the cart, or in weighing its contents; Fig. 2, a like sectional view of the same in the position it is made to assume when supporting the body of the cart in weighing its contents; Fig. 3, a plan view of the same from the upper side of the bottom frame of the cart body without its floor; Fig. 4, a view of the front end of the cart, with a side view of the weighing beam with its operating and immediate connections; and Fig. 5, a separate view of the fulcra support for the forward lever beneath the body of the cart, like letters in the figures indicating the same objects.

My invention has for its object the simplifying and therefore the cheapening of the construction and arrangement of a weighing apparatus when combined with a cart, without impairing its utility and accuracy for the purpose; and consists in supporting the platform levers directly upon the cart axletree and a single crosspiece fixed to the thill or shaft timbers, so as to dispense with the supplementary frame heretofore required for the purpose; in making the weight points of the said levers to serve also as axles to friction rollers so as to cause the latter to bear directly against parts of the bottom frame of the cart body without a dragging motion, and thus to dispense with the rocking rings or suspension loops, heretofore required, and also to allow the tilting motion of the body without its carrying with it both of the platform levers; and also in the mode of keeping the body in its proper position in connection with the said shafts frame, so as to permit its more free motion up and down in weighing, and, in tilting the body, so that it shall not impair its fixed security thereon while the cart is used in hauling or driving.

Referring to the drawings, A, is the cart body; B—B, the thills or shafts—extending under the same and united with the axle-tree of the cart; C and C', the two platform levers under the cart body; D, the weighing beam, as it is suspended when in weighing position, across the front end of the cart body. The thill pieces (B, B) are rigidly fixed to the axletree (E), and the cart body is secured thereon by means of the slotted plates of iron, *f*, *f*, (shown by the dotted lines in Figs. 1 and 2) which are connected to the axletree and also bolted rigidly to the sides of the thill pieces so as to bring their slots in vertical positions at the sides of the body of the cart and a little in rear of the axletree. A friction roller, *g*, fits loosely in each of these slots, and turns upon a journal pin, *h*, which is fixed rigidly in the side of the said frame and at point opposite thereto. The platform lever (C') rests upon knife edge fulcra, *i, i*, which are fixed upon the axletree (E), and its fellow, (C), upon like fulcra fixed in a cross piece (F) which is bolted rigidly to the underside of the thill pieces at this part, for the purpose. These levers are of the first order and are connected together at (*k*), and to the weighing beam (D) in the usual manner by pivot and notch; but their weight points are made to act as axles of the friction rollers, *l—l*, which are inserted in vertical slots made in the ends of the levers so that the said rollers shall bear up against the under sides of the cross pieces *m, m* which form a part of the bottom frame of the cart body at this part, so as to lift and support the said body and its contents, in weighing, and also so as to be freed from the same when the power arm of the lever (C') is drawn upwardly, with the weighing beam (D), by means of a hand lever (G) which operates in the usual well known manner; the downward motion of the said hand lever bringing the four friction rollers (*g—g*) up into contact with the cart body and elevating it sufficiently from the thill pieces (B, B) to clear them in weighing;

and the upward motion of the said hand lever lowering the said body down so that it shall rest directly upon the said thill pieces, and these out of contact with the friction rollers. The piece, n, serves to support the inner or power end of the lever (C) when the cart is tilted. The usual key staff is dispensed with and a simple hook, o, substituted for the purpose of keeping the body from accidentally tilting—as when the hook is disconnected from the body of the cart, there is no friction arising therefrom in weighing, as is the case from the usual key-staff staple.

It will be perceived that the supplementary frame, for supporting the weighing apparatus under the cart body, is entirely dispensed with by constructing and arranging the two levers (C and C') so as to be supported directly upon the axletree and the cross piece (F) attached to the usual thill timbers as described—thus saving materially in the original cost; that by making the weight points of these levers to serve as axles for the friction rollers (g—g) as described, the rocking, or suspension rings heretofore required to prevent a dragging motion of the lever points, are also dispensed with, and the tilting of the cart permitted without its carrying with it both of the said levers, as heretofore—thus simplifying the construction and diminishing the liability to derangement or breakage; and that the axle-tree (E) with the thill or shaft pieces (B, B), and the slotted plates (f, f,), being all rigidly fixed together as described, the body of the cart, by means of the friction rollers attached thereto so as to move in the slot in pieces (f, f), is permitted a more free motion up and down in weighing, without impairing its fixed security upon the said thill pieces while the cart is used in hauling or driving from place to place.

Having thus fully described my invention I proceed to state that what I claim as my invention and desire to secure by Letters Patent, is embraced in the three following divisions, viz:

1. I claim supporting the platform levers (C and C') directly upon the axle-tree (E), and the cross-piece (F) which is fixed to the thill timbers, substantially in the manner and for the purposes set forth and described.

2. I claim the use of the friction rollers (l—l) so that their axles shall serve as the weight points to the levers (C and C'); the same being applied to the levers so as to operate substantially in the manner and for the purposes set forth and described.

3. I also claim the combination of the vertically slotted plates (f, f,), rigidly fixed to the axle-tree (E) and the thill pieces (B, B) as described, with the friction rollers (g, g) working in the said slots and upon the journals (h, h,) fixed in the frame of the cart body as described, so as to operate together in the manner and for the purposes set forth and described.

JNO. HARTMAN, JR.

Witnesses:
  BENJ. MORISON,
  BENJ. F. SHATTUCK.